G. L. CHATFIELD.
HEATING ELEMENT FOR BUTTERING DEVICES.
APPLICATION FILED DEC. 13, 1915.

1,255,985.

Patented Feb. 12, 1918.

WITNESSES:
J. H. Swan
C. C. Horner

INVENTOR
GEORGE L. CHATFIELD

BY
Lockwood & Lockwood
ATTORNEYS

UNITED STATES PATENT OFFICE.

GEORGE L. CHATFIELD, OF INDIANAPOLIS, INDIANA, ASSIGNOR TO HOLCOMB & HOKE MANUFACTURING COMPANY, OF INDIANAPOLIS, INDIANA, A CORPORATION.

HEATING ELEMENT FOR BUTTERING DEVICES.

1,255,985.  Specification of Letters Patent.  Patented Feb. 12, 1918.

Application filed December 13, 1915. Serial No. 66,586.

*To all whom it may concern:*

Be it known that I, GEORGE L. CHATFIELD, a citizen of the United States, and a resident of Indianapolis, county of Marion, and State of Indiana, have invented a certain new and useful Heating Element for Buttering Devices; and I do hereby declare that the following is a full, clear, and exact description thereof, reference being had to the accompanying drawings, in which like numerals refer to like parts.

The object of this invention is to provide a heating element for the reservoir of a buttering device for heating and melting the butter therein.

The main feature of the invention consists of the means for attaching the heating element to the reservoir so that it can be easily and readily removed therefrom. Heretofore like heating elements have been yieldingly secured to the reservoir, but have not been removably secured thereto, causing some difficulty in adjusting them should it be desired to do so. By means of this invention, all that is necessary to do in order to remove the heating element is to loosen a pair of thumb screws and slide the element from under the reservoir.

The full nature of the invention will be understood from the accompanying drawings and the following description and claim.

Figure 1:
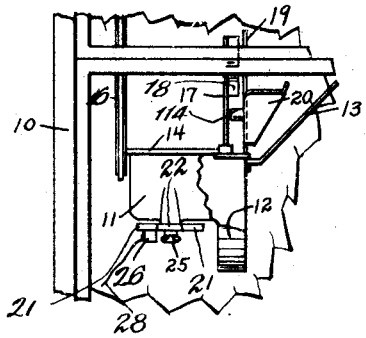
Figure 2:
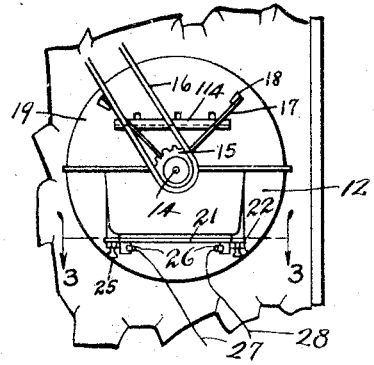
Figure 3:
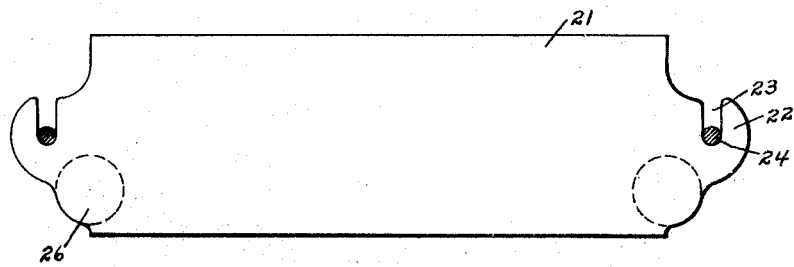

In the drawings, Figure 1 is a side elevation showing a portion of a popcorn machine with the buttering device and heating element thereon. Fig. 2 is a front elevation showing the same as in Fig. 1. Fig. 3 is a cross section on the line 3—3 of Fig. 2, showing an enlarged plan view of the heating element.

In the drawings there is shown a portion of a popcorn machine having a frame 10 and a butter reservoir 11 having a semicircular portion 12 into which the butter passes after being melted and when in liquid form. Said reservoir is secured to the frame by means of a bracket 13. Secured across the top of the reservoir there is a shaft 14 having a gear 15 which is driven by a chain 16 from a driving means, not shown herein. On the other end of said shaft there are arms 17 having bucket-shaped ends 18 for lifting the liquid butter from the reservoir 12 and dumping it into a trough 114 where it passes through slots or openings in said trough so as to drop down on the outside of the partition 19 and engage the popped corn which is discharged in a chute 20. The unused butter then passes back through perforations in the partition 19 to the reservoir 12 to be used over again.

On the bottom of the reservoir there is a heating element 21 being adapted to fit snugly against said reservoir for heating and melting the butter therein. Said heating element has ears 22 on each end thereof, each of said ears having a slot 23 adapted to be engaged by a lug or screw member 24, whereby said heating element may be held in place by thumb screws 25 so as to be quickly and easily removed from said reservoir.

There are wires 27 and 28, leading to terminals 26 on each end of said heating element whereby it is electrically heated by a flattened coil on the inside thereof, not shown.

The invention claimed is:

A flat rectangular electrical heating element, terminals at the outer end corners of the heating element for conveying a heating agency therethrough, said terminals depending from the heating element, and an ear at each end of the heating element, each ear having a slot extending inwardly from the same edge thereof, the open ends of the slots being away from said terminals, whereby the heating element may be moved bodily in a horizontal plane and in a straight line into or out of operative position.

In witness whereof, I have hereunto affixed my signature in the presence of the witnesses herein named.

GEORGE L. CHATFIELD.

Witnesses:
 GIL K. REEVES,
 L. D. THOMAS.